United States Patent [19]

Burghardt et al.

[11] Patent Number: 5,101,292
[45] Date of Patent: Mar. 31, 1992

[54] CONNECTOR APPARATUS FOR TRANSMITTING ONE OR MORE DATA SIGNALS VIA LIGHT WAVEGUIDES

[75] Inventors: Hartmut Burghardt, Holzkirchen; Ralph Meyer, Olching, both of Fed. Rep. of Germany

[73] Assignee: Siemens Aktiengesellschaft, Munich, Fed. Rep. of Germany

[21] Appl. No.: 548,551

[22] Filed: Jul. 5, 1990

[30] Foreign Application Priority Data

Jul. 10, 1989 [EP] European Pat. Off. ........... 89112605

[51] Int. Cl.⁵ .............................................. H04J 3/00
[52] U.S. Cl. .................................. 359/135; 359/154
[58] Field of Search ............... 370/4, 3, 1, 112, 84, 370/54, 58.1; 455/617, 608, 612

[56] References Cited

U.S. PATENT DOCUMENTS

| 3,665,405 | 5/1972 | Sanders et al. | 370/55 |
| 4,333,176 | 6/1982 | Looscheu | 370/84 |
| 4,750,172 | 6/1988 | Hornung et al. | 370/112 |
| 4,972,408 | 11/1990 | Herve et al. | 370/112 |

FOREIGN PATENT DOCUMENTS 3333775 4/1985 Fed. Rep. of Germany ...... 370/112

Primary Examiner—Curtis Kuntz
Assistant Examiner—Kinfe-Michael Negash
Attorney, Agent, or Firm—Hill, Van Santen, Steadman & Simpson

[57] ABSTRACT

A connector link contains a distributor having demultiplexers and multiplexers for the division of a data signal having a high data rate or the division of up to n data signals having lower data rates onto n parallel data paths. As a result thereof, one data signal having a high data rate or a plurality of data signals having a lower data rate can be optionally transmitted. Generally, an auxiliary channel for the transmission of special information is also provided. A time-division multiplex signal that is redundantly coded is formed. A reception section contains corresponding, inverse devices for recovering the original data signals.

17 Claims, 3 Drawing Sheets

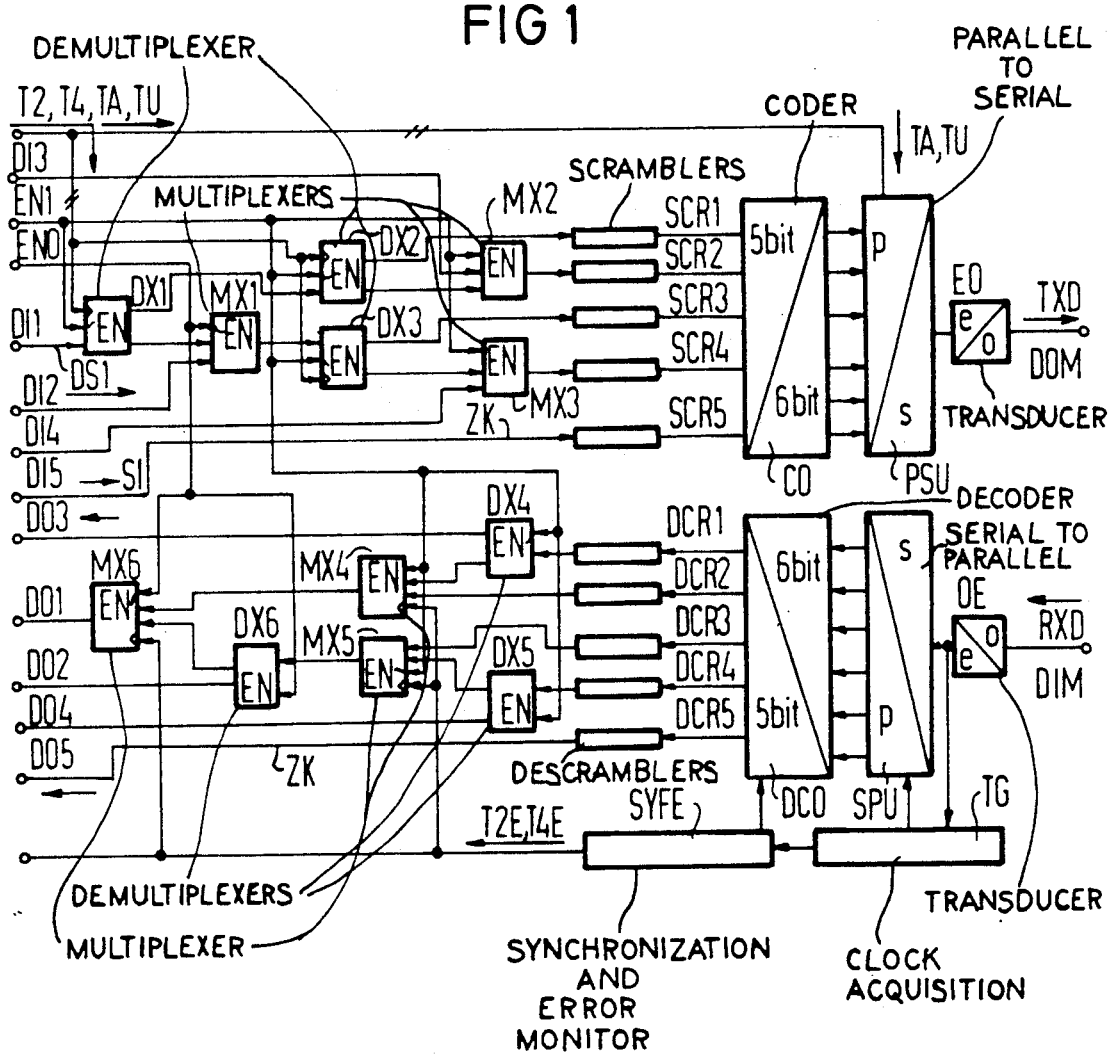

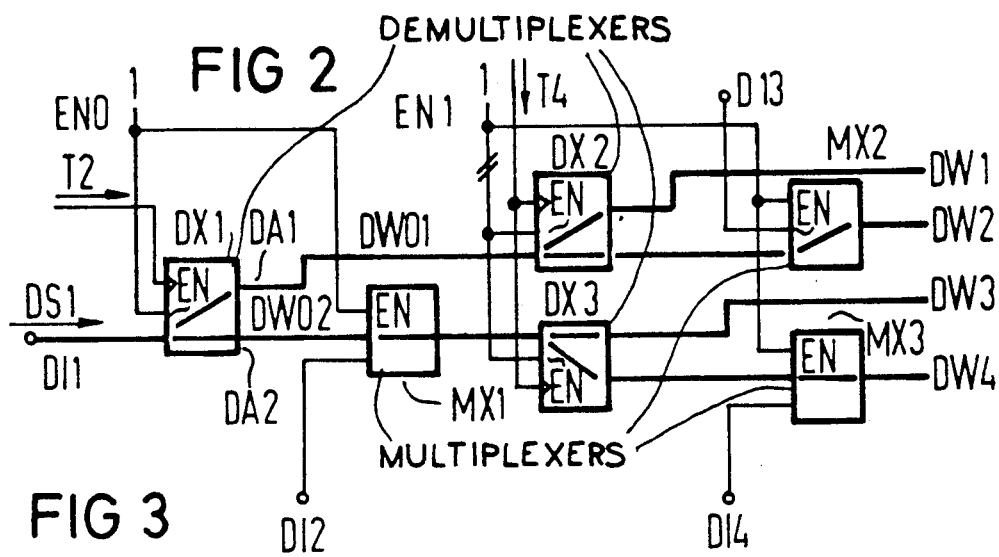
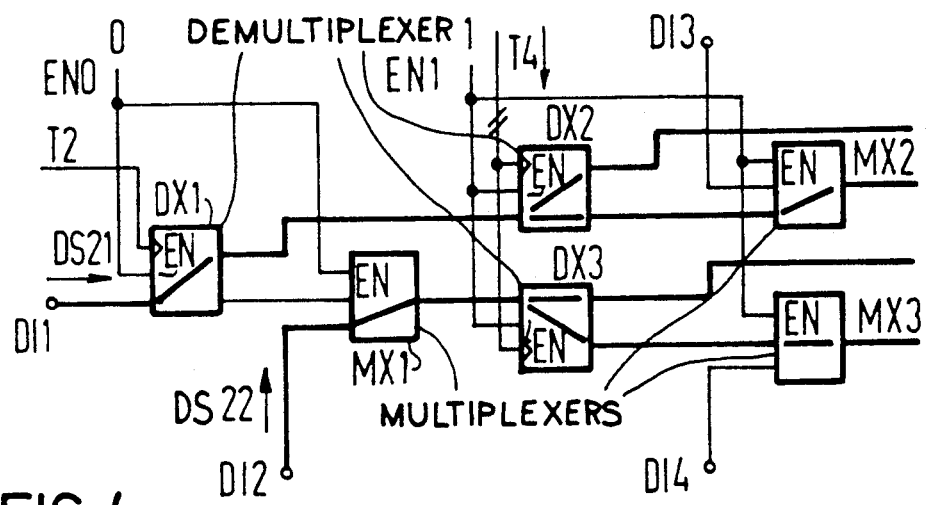
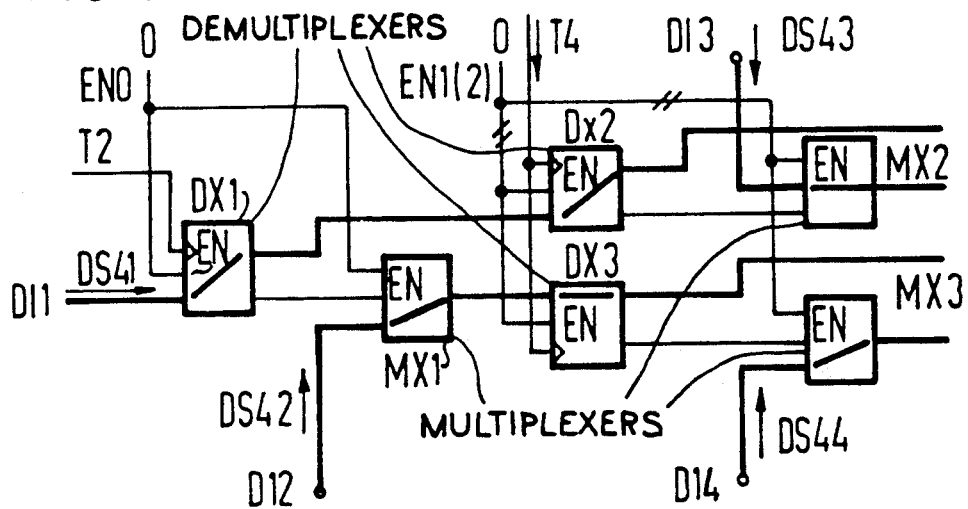

CONNECTOR APPARATUS FOR TRANSMITTING ONE OR MORE DATA SIGNALS VIA LIGHT WAVEGUIDES

BACKGROUND OF THE INVENTION

The present invention is directed to a connector means for data transmission via light waveguides.

Copper cables have been largely utilized for data transmission up to the present time. Conforming to interference or noise emission requirements is a particular problem. The outlay for shielding increases with the transmission data rate, so that the combination of a plurality of data channels by multiplexing is frequently not cost-beneficial. The data connections become especially problematical when only a single-sided grounding (such as, star grounding) is permissible. Connector means having light waveguides were therefore developed, but these can only be utilized for a fixed data rate and for a fixed number of channels.

SUMMARY OF THE INVENTION

It is an object of the present invention to provide a universally employable connector means for data transmission using light waveguides.

This object is achieved by a connector apparatus comprising: on a transmission side a distributor means for dividing at least one of a data signal having a high data rate or up to n data signals having lower data rates onto n parallel data paths; a coder means for converting data transmitted on the parallel data paths into a multiplex signal that has a redundant code; for transmitting a different plurality of 1 through n data signals, the multiplex signal having the same data rate; on a reception side a decoder means for converting one data signal and an inverse means for the recovery of at least one of the one data signal having the high data rate or the up to n data signals having the lower data rate.

The universal employability of the connector means (data transmission link) is advantageous for data channels having different data rates that, however, must have a whole-number ratio relative to one another for a prescribed transmission data rate. To this end, a data channel having a high transmission capacity is divided int a plurality of data channels having lower transmission capacity and are supplied to a coder via parallel data paths. Data signals having a lower data rate than the data rate on the transmission path can also be transmitted on the basis of a multiple transmission of the individual bits. Since an increase in the data rate is unproblematical given an employment of light waveguides, an auxiliary data channel is advantageously made available via which special information are transmitted, for example, for synchronization or for error monitoring.

A connector means having up to four data channels and one auxiliary channel proves especially beneficial. Data signals with the currently most frequently employed data rates of 2, 4 and 8Mbit/s can thus be realized.

It is also advantageous that other transmission data rates can be realized by employing a different oscillator frequency and/or a different phase control circuit.

By incorporating the connector means in plug devices of the optical fiber connecting cable, they can be unproblematically used for replacing a standard cable. Of course, terminals for a power supply, etc., are already provided in the design of the equipment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block diagram of a connector means comprising a transmission section and a reception section;

FIG. 2 is a block diagram of a fundamental circuit diagram of the through-connect path for a one-channel connection;

FIG. 3 is a block diagram of a fundamental circuit diagram of the through-connect paths for a two-channel connection;

FIG. 4 is a block diagram of a fundamental circuit diagram of the through-connect paths for a four-channel connection.

DESCRIPTION OF THE PREFERRED EMBODIMENT

Figure 5:
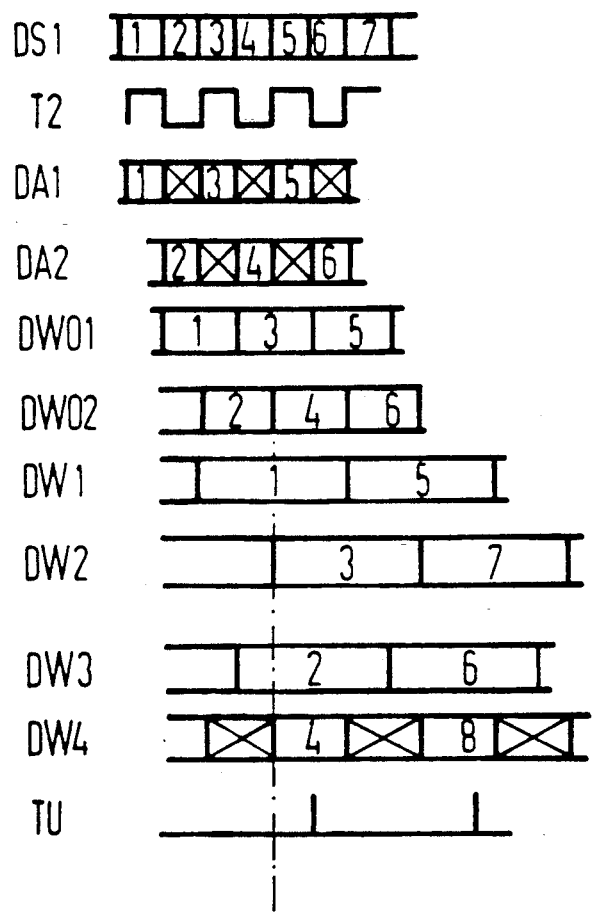
FIG. 5 is a timing diagram for a transit time compensation circuit.

The transmission section of the connector means shown in FIG. 1 contains a distributor means having three demultiplexers DX1 through DX3 for parallelizing and distributing a data signal onto four data paths and having three multiplexers MX1 through MX3 for connecting up to four different data signals. A scrambler SCR1 through SCR4 is connected into each of the four parallel data paths.

The first data input DI1 is connected to the input of the first demultiplexer DX1 whose first output is connected to the input of the second demultiplexer DX2 whose first output is in turn connected to the input of the first scramble SCR1. The second output of the second demultiplexer DX2 is connected via the second multiplexer MX2 to the input of the second scrambler SCR2. The second output of the first demultiplexer DX1 is connected via the first multiplexer MX1 (whose second input is the second data input DI2) to the input of the third demultiplexer DX3 whose first output is connected to the third scrambler SCR3. The second output of the third demultiplexer, DX3 is connected via the third multiplexer MX3 (whose second input is the fourth data input DI4) to the fourth scrambler SCR4. The second input of the second multiplexer MX2 is the third data input DI3.

A fifth data input DI5 for the transmission of special information is also provided, this being connected to a fifth scrambler SCR5. The scrambler outputs are connected to parallel inputs of a 5 bit/6 bit coder whose outputs are connected to the inputs of a parallel-to-serial converter PSU that outputs a multiplex signal TXD via an electro-optical transducer EO.

The demultiplexer DX1 is supplied with a clock signal T2 having half the maximum clock frequency (4 MHz) of a data signal that has the maximum data rate (8 Mbit/s). The first demultiplexer DX1 and the first multiplexer MX1 are controlled via a control input enable ENO, whereas the further demultiplexers DX2, DX3 and the further multiplexers MX2 and MX3 are controlled via a second control input EN1. A logical "1"

denotes for the demultiplexer DX1 that the input signal is through-connected onto the outputs in alternation with the clock T2. The demultiplexers DX2 and DX3 are supplied with a clock T4 or with two clocks T4 phase-shifted relative to one another and having half the clock rate T2. The multiplexers here correspond to unclocked switch-over means with which an input signal is optionally constantly through-connected to the output.

Of course, the demultiplexers can also be fashioned differently and a parallelization can occur with different clocks. The electro-optical transducer EO via whose data output the multiplex signal TXD is transmitted via a light waveguide is connected at the output of the parallel-to-serial converter PSU.

The function of the transmission sections will now be set forth in greater detail with reference to FIGS. 2–4. In order to transmit one data signal DS1 having the maximum data rate, 8 Mbit/s in this case, it is necessary to respectively parallelize for successive bits. To this end, the logical "1" is applied to the two control inputs EN0 and EN1. The one data signal DS1 is received at the first data input DI1. This data signal DS1 is first divided into an upper and lower data stream by the clock T2. A further division of the upper data stream onto two data paths occurs in the second demultiplexer DX2; the lower data stream is likewise divided onto two data paths in the third demultiplexer DX3. The multiplexers MX1 through MX3 thereby disconnect the remaining data inputs DI2 through DI4 and through-connect the parallelized data signal DS1. The bits of the four data paths must pend simultaneously at the input of the code converter CO. This is achieved by delay units that are inserted into the different data paths. This shall be discussed in greater detail below. In this embodiment, the data are separately scrambled in the individual data paths. The scramblers, of course, can also be connected to one another. The multiplex signal output by the parallel-to-serial converter can likewise be scrambled.

FIG. 3 shows the transmission of two data signals DS21 and DS22 that are received at the data inputs DI1 and DI2, respectively. To this end, the logical "0" must merely be applied to the first control input EN0. The division of the data signal DS21 onto two parallel data paths occurs in the second demultiplexer DX2, and that of the data signal DS22 occurs in the third demultiplexer DX3. The multiplexer MX1 through MX3 are again connected such that only the data signals DS21 and DS22 are through-connected and the data inputs DI3 and DI4 are disconnected.

In FIG. 4, the logical "0" is received at the control inputs EN0 and EN1. As a result thereof, four data signals DS41 through DS44 that are adjacent at the data inputs DI1 through DI4 are through-connected. All demultiplexers are blocked, i.e. the inputs are respectively through-connected to a defined output. Of course, it is also possible to combine data signals having different speeds. The control inputs of the multiplexers and demultiplexers, for example, DX2, DX3 and MX2, MX3 must then be separately driven, this being indicated by the control input EN1 (2). Thus, given a combination of the circuits of FIG. 3 and of FIG. 4, a data signal DS21 having half the maximum data rate and two further data signals DS42 and DS44 each of which has one-fourth of the maximum data rate can be simultaneously transmitted. When data signals having lower data rates are to be transmitted, then the bits thereof are multiply transmitted.

Respectively four successive bits must simultaneously pend at the input of the coder CO (FIG. 1). This can be achieved by inserting delay units into the individual signal paths. Binary memory elements are expediently used as delay units. The timing diagram of FIG. 5 shows a possible signal curve for the transmission of the data signal DS1. This signal curve is achieved in that FIG. 2 circuits are inserted at the outputs of the demultiplexers. In FIG. 5, the individual bits of the data signal are referenced 1, 2, 3, . . . These bits are through-connected to the outputs DA1, DA2 of the first demultiplexer DX1 in alternation with the clock signal T2. The data signals on the data paths DW01 and DW02 arise by sampling the through-connected bits. The data paths are shown in FIG. 2. The input signals are further parallelized in the demultiplexer DX2 and DX3 with clock signals T4 phase-shifted relative to one another, respectively having half the frequency of T2. The illustrated data signals on the data paths DW1 through DW3 derive by renewed sampling of the output signals of the demultiplexers DX2 and DX3. The signal on the data path DW4, by contrast, can be conducted directly to the scrambler or, respectively, to the coder. The transfer clock is referenced TU. When data signals having the lower data rate are transmitted, some of the trigger circuits and, if necessary, all trigger circuits can be bridged.

The reception section of the connector means is inversely constructed with respect to the transmission section. The multiplex signal RXD is received at the data input DIM and is supplied to an opto-electrical transducer OE. The latter is connected to a serial-to-parallel converter whose parallel outputs are connected to a decoder DC0. The scramblers DCR1 through DCR5 are connected to the five outputs thereof. The data signal containing the auxiliary information is directly output at fifth output D05 via the descrambler DCR5.

The first descrambler DCR1 is connected to a fourth demultiplexer DX4 whose first output is the data output D03 and whose second output can be combined by a fourth multiplexer MX4 with the second decoder output or, respectively, with the output of the second descrambler DCR2. In the same manner, the fourth output is connected via a fifth demultiplexer DX5 to the data output D04 or, respectively, to an input of a fifth multiplexer MX5 whose second input is connected to the third output of the decoder DC0. The output of the fourth multiplexer MX4 is connected via a sixth multiplexer MX6 to the data output D01. The output of fifth multiplexer MX5 is directly through-connectible via a sixth demultiplexer DX6 to the second data output D02 or is through-connectible to a second data input of the sixth multiplexer MX6.

The reception section has a function corresponding to that of the transmission section. Given transmission of four or, respectively (with the auxiliary channels ZK), five different data signals, these are output at the data outputs D01 through D04 or, respectively, D05. Likewise, data signals DS21, DS22 having twice the speed can again be formed by combination of the output signals of respectively two outputs of the decoder or the output signals of the four first outputs can be combined to form a single data channel DS1 that is then output at the data output DO1. The control of the operating mode occurs in conformity with the control of the transmission section via the same control inputs EN0 and EN1; however, demultiplexers replace multiplexers and multiplexers replace demultiplexers since the output signals of the decoder here are combined into the original data signals DS1 or DS21 and DS22. Delay units are generally not required. The receive-side clock signals T2E and T4E for controlling the multiplexers in order to realize a conversion into a serial signal DS1, DS21 or DS22 and for the decoder are supplied by a clock acquisition TG and by a synchronization and error-monitoring means SYFE.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A connector apparatus for transmitting at least one data signal via light waveguides, comprising: on a transmission side a distributor means having a plurality of demultiplexers for dividing at least one data signal having a high data rate or for dividing up to n data signals having lower data rates than the high data rate onto n parallel data paths; a coder means having at least n inputs connected to the n parallel data paths, respectively, for converting data signals transmitted on the n parallel data paths into a multiplex signal that has a redundant code on an output of the coder means, the multiplex signal having a set data rate; an electro-optical transducer having an input connected to the output of the coder means and having an output connected to a light waveguide; on a reception side an opto-electrical transducer having an input connected to the light waveguide and having an output; a decoder means for converting a received multiplex signal on an input thereof into n data signals on n outputs, respectively, thereof, the input of the decoder means connected to the output of the opto-electrical transducer; and an inverse means having a plurality of multiplexers and having n parallel data paths connected to the n outputs of the decoder means, respectively, for the recovery of at least said one data signal having the high data rate or the up to n data signals having the lower data rate.

2. The connector apparatus according to claim 1, wherein the apparatus further comprises on the transmission side an auxiliary data path having a data rate equal to data rates of the n parallel data paths in the distributor means, an auxiliary data signal on the auxiliary data path being supplied to the coder means together with the data signals on the n parallel data paths.

3. The connector apparatus according to claim 1, wherein the distributor means and the inverse means each process up to n=4 data signals.

4. The connector apparatus according to claim 2, wherein the coder means provides a 5 bit/6 bit code conversion; and wherein a corresponding decoder means is provided.

5. The connector apparatus according to claim 1, wherein the distributor means has three multiplexers and three demultiplexers; and wherein the inverse means likewise contains three multiplexers each having respectively two inputs or, respectively, two outputs.

6. The connector apparatus according to claim 1, wherein control clocks are connected to the distributor means and wherein different transmission rates and the appertaining data rates of the data signals are realized by using control clocks having different frequencies.

7. The connector apparatus according to claim 1, wherein delay units are inserted into the n parallel data paths of the distributor means and of the inverse means.

8. The connector apparatus according to claim 1, wherein at least one scrambler means is provided at the transmission side; and wherein at least one descrambler means is provided at the reception side.

9. The connector apparatus according to claim 1, wherein the distributor means is integrated into plug devices of light waveguides.

10. The connector apparatus according to claim 4, wherein the transmission rate is 12Mbit/s.

11. The connector apparatus according to claim 3, wherein the coder means provides a 5 bit/6 bit code conversion; and wherein a corresponding decoder means is provided.

12. The connector apparatus according to claim 11, wherein the transmission rate is 12Mbit/s.

13. A connector apparatus for transmitting at least one data signal via light waveguides, comprising: on a transmission side a distributor means having a plurality of demultiplexers for dividing at least one data signal having a high data rate or for dividing up to data signals having lower data rates than the high data rate onto parallel data paths; an auxiliary data path having a data rate equal to data rates of the four parallel data paths for transmitting an auxiliary data signal; a coder means having at least n inputs connected to the n parallel data paths, respectively, and a further input connected to the auxiliary data path for converting data signals transmitted on the four parallel data paths and the auxiliary signal into a multiplex signal that has a redundant code on an output of the coder means, the coder means providing a 5 bit/6 bit code conversion, and the multiplex signal having a set data rate; an electro-optical transducer having an input connected to the output of the coder means and having an output connected to a light waveguide; on a reception side an opto-electrical transducer having an input connected to the light waveguide and having an output; a decoder means for converting a received multiplex signal on an input thereof into four data signals on four outputs, respectively, thereof, and into an auxiliary signal the input of the decoder means connected to the output of the opto-electrical transducer; and an inverse means having a plurality of multiplexers and having four parallel data paths connected to the four outputs of the decoder means, respectively, for the recovery of at least said one data signal having the high data rate or the up to four data signals having the lower data rate; the distributor means having three multiplexers and three demultiplexers; and the inverse means likewise having three multiplexers and three demultiplexers each having respectively two inputs or, respectively, two outputs; and control clocks connected to the distributor means wherein different transmission rates and the appertaining data rates of the data signals are realized by using control clocks having different frequencies.

14. The connector apparatus according to claim 13, wherein delay units are inserted into the four parallel data paths of the distributor means and of the inverse means.

15. The connector apparatus according to claim 13, wherein at least one scrambler means is provided at the transmission side; and wherein at least one descrambler means is provided at the reception side.

16. The connector apparatus according to claim 13, wherein the distributor means is integrated into plug devices of light waveguides.

17. The connector apparatus according to claim 13, wherein the transmission rate is 12Mbit/s.

* * * * *